US005276951A

United States Patent [19]

Gluszek

[11] Patent Number: 5,276,951

[45] Date of Patent: Jan. 11, 1994

[54] TUBULAR LOCK PULLER

[75] Inventor: Donald Gluszek, Oak Lawn, Ill.

[73] Assignee: HPC, Inc., Schiller Park, Ill.

[21] Appl. No.: 2,417

[22] Filed: Jan. 8, 1993

[51] Int. Cl.[5] ..... B23P 19/04

[52] U.S. Cl. ..... 29/265

[58] Field of Search ..... 29/263-265

[56] References Cited

U.S. PATENT DOCUMENTS

| | | | |
|---|---|---|---|
| 2,031,998 | 2/1936 | Bliss | 29/265 |
| 2,059,376 | 11/1936 | Lombardo . | |
| 2,070,342 | 2/1937 | Tarrie . | |
| 2,655,808 | 10/1953 | Wilson . | |
| 2,755,540 | 7/1956 | Crozier | 29/265 |
| 3,052,973 | 9/1962 | Williams | 29/265 |
| 3,241,223 | 3/1966 | Anderson | 29/265 |
| 3,270,538 | 9/1966 | Kerr . | |
| 3,330,141 | 7/1967 | Greenwald . | |
| 3,535,765 | 10/1970 | Denehie | 29/265 |
| 4,507,837 | 4/1985 | Hinkle | 29/265 |

FOREIGN PATENT DOCUMENTS

| | | |
|---|---|---|
| 2389-737 | 1/1979 | France . |
| 2389-740 | 1/1979 | France . |

*Primary Examiner*—Robert C. Watson
*Attorney, Agent, or Firm*—David D. Kaufman

[57] ABSTRACT

A hand-held tool for pulling the inner cylinder from a tubular lock that has become inoperative. The tool comprises a cylindrical housing carrying a threaded main shaft which has a front segment with resilient fingers. The fingers are radially compressible for insertion into the annular key passageway of the lock whereupon the fingers return to original condition and have tips that engage the inner rim of the lock cylinder. A second shaft is slidable within the main shaft and carries a locking cup that retains the inserted fingers in the rim-engaging condition. A threaded nut on the main shaft is rotatable manually and with a wrench or the like to withdraw the main shaft and forcibly pull the inner cylinder from the lock.

15 Claims, 3 Drawing Sheets

TUBULAR LOCK PULLER

BACKGROUND OF THE INVENTION

This invention relates generally to locksmith tools and, more particularly, to a locksmith tool for opening disabled or inoperative tubular locks.

A class of locks known as cylindrical or tubular locks has tumblers comprising thin flat bars which are spring loaded and receive endwise movement from urging by a cylindrical key. In general, the standardized construction of tubular locks includes an inner, smooth-bore cylinder mounted within a sealed, outer cylinder. The round key is insertable within the cylinder to operate the lock. Tubular locks are employed in a variety of locks, such as padlocks and T-handle locks, and are considered safe and highly tamper-proof because of their particular structure and operation.

All locks, including the more common types having rotary or swinging tumblers, are subject to wear and possible breakdown. When that condition occurs, it becomes necessary to destroy the lock in order to gain access to the structure, appliance or device to which the lock is attached. One of the more common uses of tubular locks is in T-handle locks found on coin-operated vending machines for drinks, candies, foods, and the like. Frequently these vending machines are placed in positions where they are exposed to the corrosive and rusting effects of the elements or in environments where dirt and grit are prevalent. These vending machines also require frequent servicing for restocking of merchandise and withdrawal of collected coins. As a result of the frequent and hard usage the tubular locks can become inoperative due to breakdown of the springs, corrosion, impacted foreign matter, or the like. Access to the interior of the vending machine can then be gained either by destroying or permanently damaging the expensive machine (an unacceptable option) or by destroying and removing the tubular lock so that the relatively inexpensive T-handle lock can be replaced.

Even where a tubular lock is part of a padlock, it is sometimes difficult or impossible to cut through a hardened steel lock without special cutting tools. In such a case, it also would be desirable if the tubular lock could be easily removed.

Prior developments in dealing with tubular lock problems reveal a number of devices designed to function as lock picks or templates for making substitute keys when an original key is lost. See, for example, U.S. Pat. Nos. 2,059,376; 2,070,342; 2,655,808; 2,270,538; 3,330,141; and French Patents 2389-737 and 2389-740. I am unaware, however, of a prior device capable of specifically removing a tubular lock from its operational structure. There thus exists a need for a device or tool which is capable of dismantling or removing a tubular lock from its surrounding environment.

BRIEF SUMMARY OF THE INVENTION

The present invention provides a convenient locksmith tool which can be employed for quickly and readily dismantling and removing a tubular lock from its surrounding structure. The invention is operable to destroy the tubular lock by pulling therefrom the inner cylinder.

Briefly, the lock puller comprises a hand-held cylindrical housing which is open at the front. A threaded shaft is mounted in the housing so that the shaft is nonrotatable but movable longitudinally. At its forward end, the threaded shaft has an unthreaded segment which is formed with longitudinal slits thereby providing a plurality of circumferentially arranged flexible fingers. The tip of each finger is formed with a camming face that tapers forwardly from a substantially vertical gripping face. The ring of flexible fingers thus is readily insertable into the annular passageway of the inner cylinder of the tubular lock.

A central, or second shaft is slidably mounted in the threaded shaft and carries at its front end a cylindrical locking cup having a diameter substantially equal to the inner diameter of the unthreaded segment of the threaded shaft. When the locking cup is withdrawn rearwardly, the fingers may be flexed inwardly and inserted into the annular passageway. After such insertion, the cup may be moved forwardly to spread or maintain the fingers in their operational position and prevent inward flexing thereof. In this condition, the vertical gripping faces of the finger tips bear against the inner rim of the inner cylinder and the threaded shaft is thus unable to be removed from the inner cylinder.

A nut is threadedly mounted on the threaded shaft projecting rearwardly from the housing and pin and keyway means cooperate to permit longitudinal movement of the threaded shaft but prevent its rotation. By rotational application of force to the nut, with a suitable tool such as a wrench or pliers, the threaded shaft is caused by move rearwardly with the inner cylinder of the lock gripped thereto. After sufficient force is applied, the cylinder will shear the retaining pin which holds the inner cylinder in the sealed outer cylinder or destroy itself. In either case, the inner cylinder moves past the retaining pin and is thereby removable.

The inventive tool is small, simple to use, and may be quickly applied for coping with conditions of the type described. Numerous other advantages and features or the present invention will become apparent from the following detailed description of the invention, from the claims and from the accompanying drawings.

BRIEF DESCRIPTION OF THE DRAWINGS

In the accompanying drawings forming a part of the specification, in which like numerals are employed to designate like parts throughout.

DETAILED DESCRIPTION OF THE INVENTION

Figure 1:
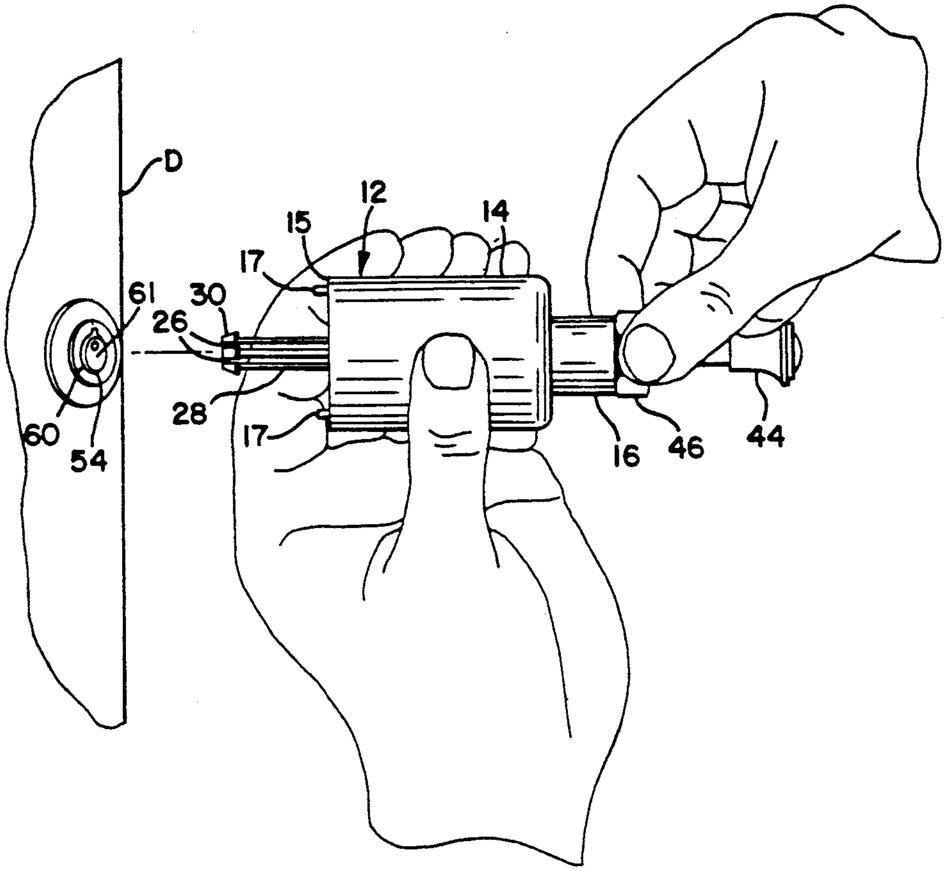
FIG. 1 is an elevational view of a tubular lock puller embodying the principles of the invention and showing the same in relation to a conventional tubular lock on a device D prior to use.

Referring to the various Figures of the drawings, the numeral 10 indicates generally a tubular lock puller embodying the principles of the invention. Lock puller 10 comprises a cylindrical housing 12 having a hand-grippable front section 14 opening to the front thereof defined by a front edge 15 and a narrower, rearwardly extending neck 16. Neck 16 and portions of the front section 14 are provided with a continuous bore 18 extending therethrough (see FIG. 3). A pair of positioning pins 17, 17 is spring-loaded in the housing section 14 and projects forwardly from the front edge 15 lo thereof for a purpose to be subsequently described.

A puller shaft 20 is slidably positioned in the bore 18. Puller shaft 20 comprises an elongated threaded section 22 and an integrally formed front section 24. The front section 24 is unthreaded and of relatively thin gauge metal and formed with a plurality of circumferentially spaced slits 26 opening to the front of said section. Front section 24 thereby comprises a plurality of flexible fingers 28 capable of functioning as a variable diameter annulus. Each of the fingers 28 comprises a front tip having a forwardly tapering camming surface 30 and a substantially vertical gripping surface 32 behind the camming surface. Threaded section 22 of the puller shaft 20 has formed therein a keyway 34 extending over substantially the full length of said threaded section. A pin 36 is mounted in the shaft neck 16 and projects into the keyway 34 so that puller shaft 20 is non-rotatable but capable of longitudinal movement within the bore 18.

Figure 3:
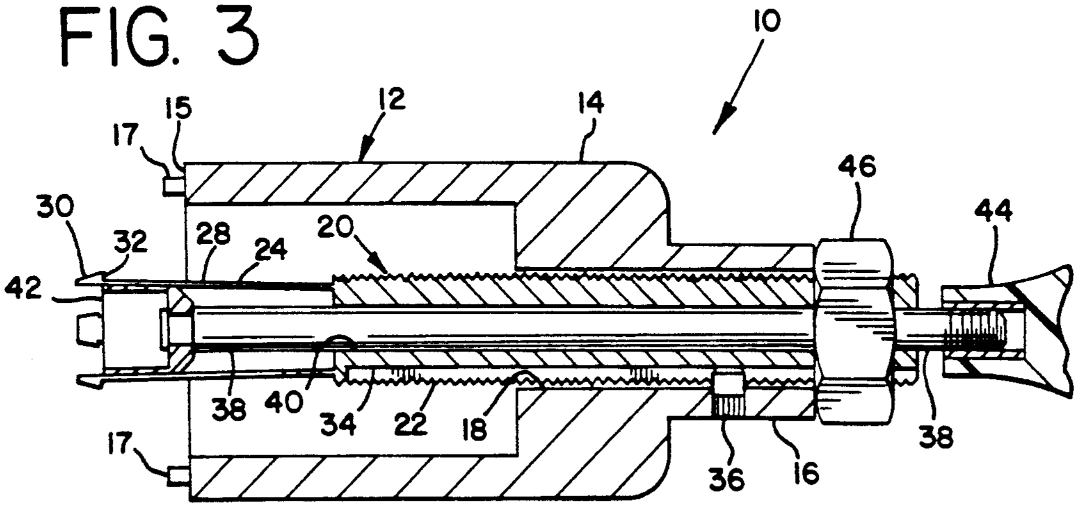
FIG. 3 is an enlarged sectional view of the lock puller, with the locking cup moved forward into the operational position.
Figure 2:
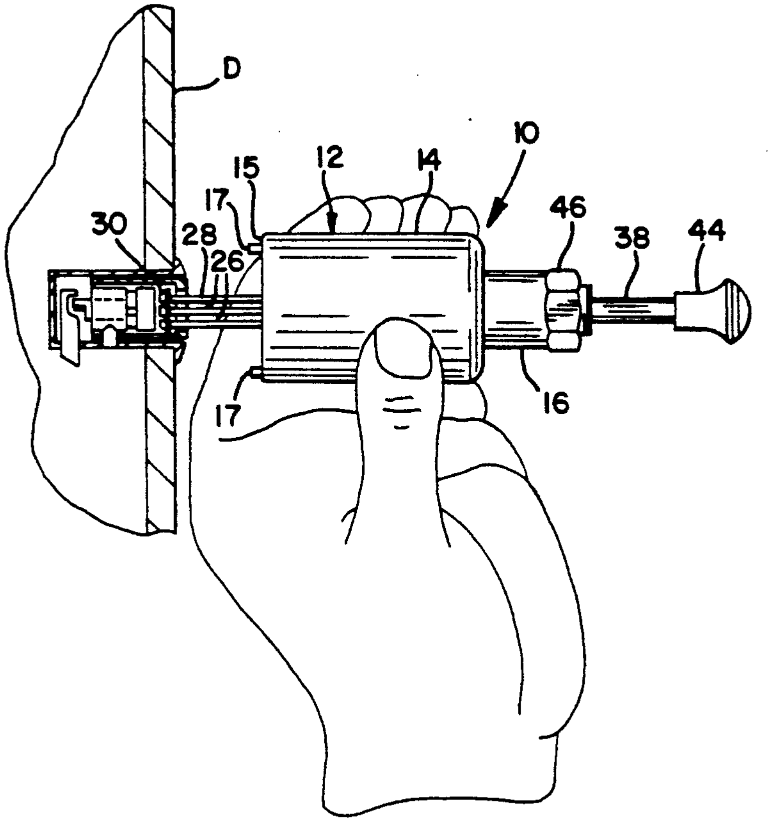
FIG. 2 is an elevational view showing the flexible fingers inserted into the annular passageway of the tubular lock and with the internal structure of the lock shown generally in section.
Figure 4:
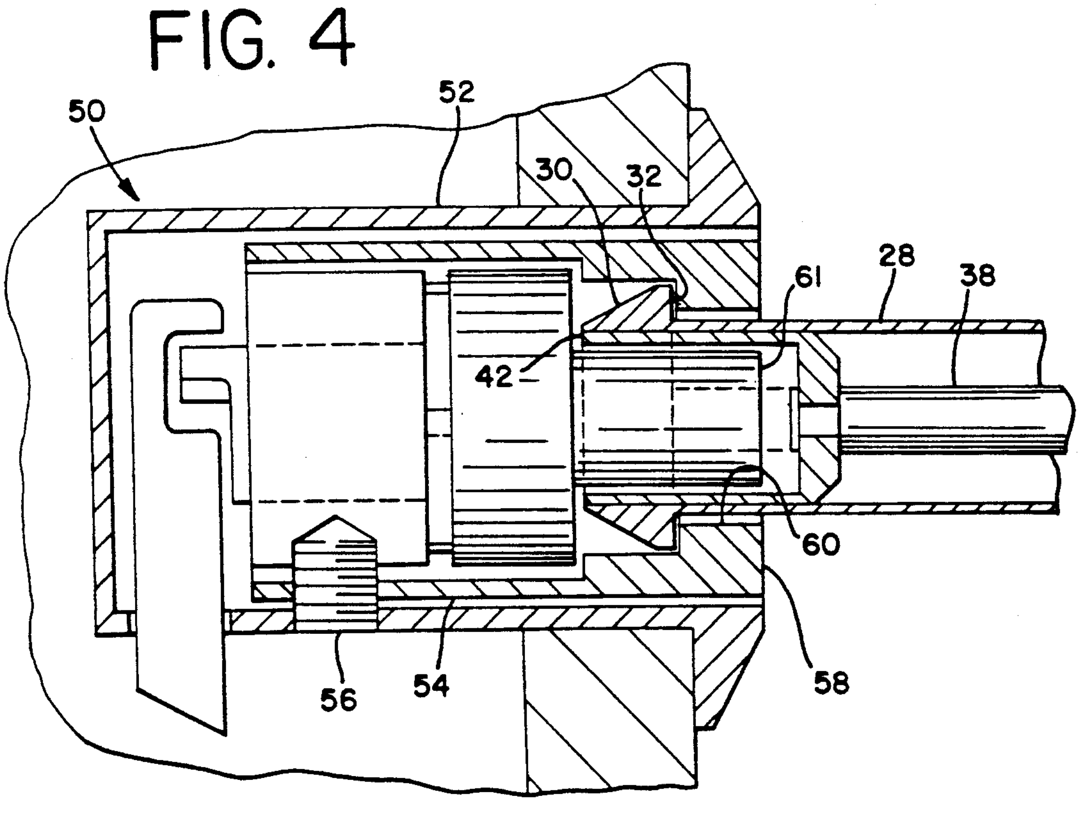
FIG. 4 is an enlarged sectional view of the lock with the fingers inserted therein and with the locking cup moved forwardly into operational position.

A smooth center shaft 38 is slidably positioned in a center bore 40 in the puller shaft 20. At its front end, the center shaft carries a cylindrical locking cup 42 of substantially the same diameter as the inner diameter of the puller shaft front section 24. Center shaft 28 also carries a handle or knob 44 at its rear end whereby said shaft and locking cup 42 may be moved longitudinally as illustrated in FIGS. 3 and 4. When the locking cup 42 is in the withdrawn or inoperative position of FIGS. 1 and 2, the fingers 28 are unimpeded and may be flexed inwardly. However, forward movement of the cup 42 to the operative position, as in FIG. 4, serves to prevent inward flexing of said fingers.

Threaded driving means comprising a hexagonal nut 46 is mounted on the threaded shaft 22 projecting rearwardly from the housing neck 16. The function of said driving means will become apparent as the description proceeds.

Figure 5:
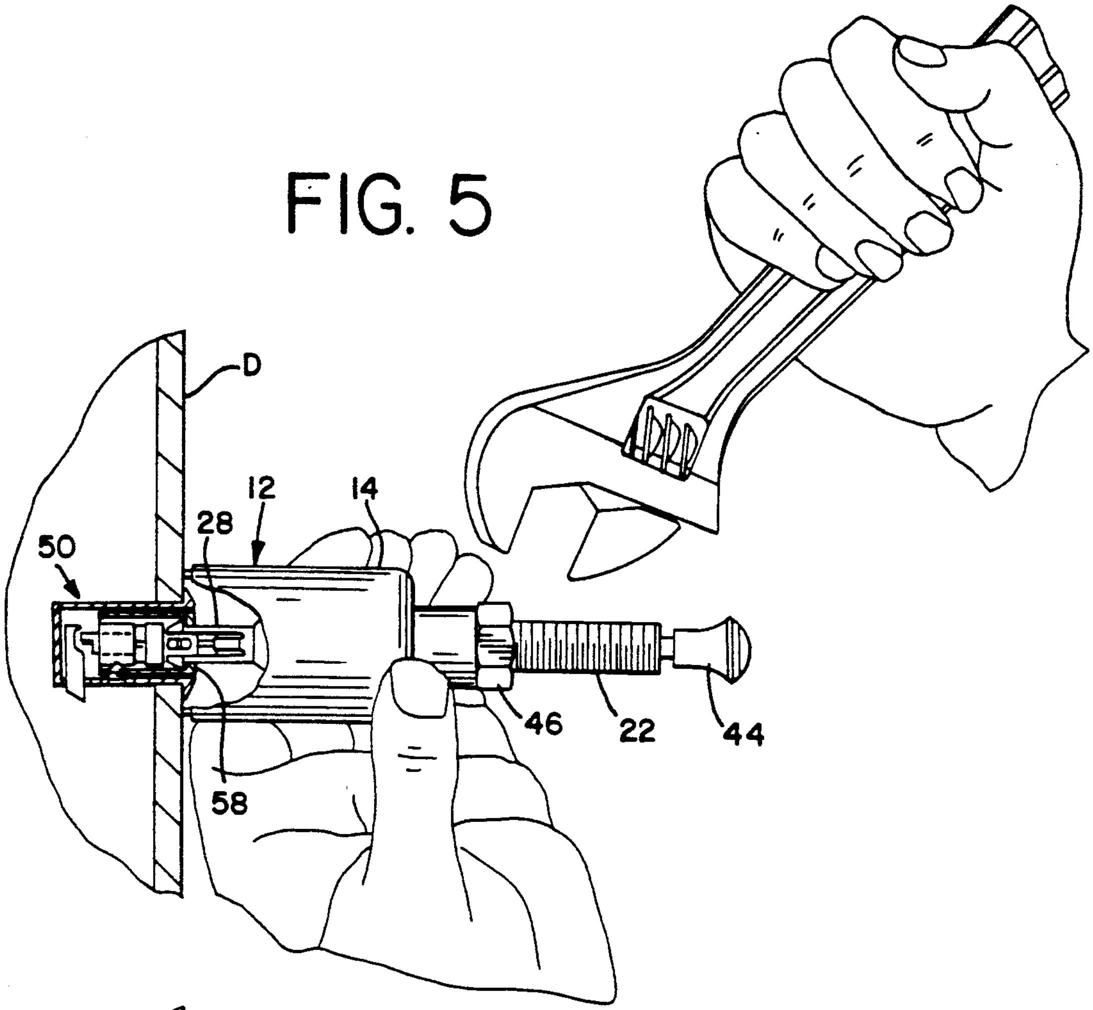
FIG. 5 is an elevational view of the operationally inserted lock puller showing the application of rotational force to the threaded shaft with a tool.
Figure 6:
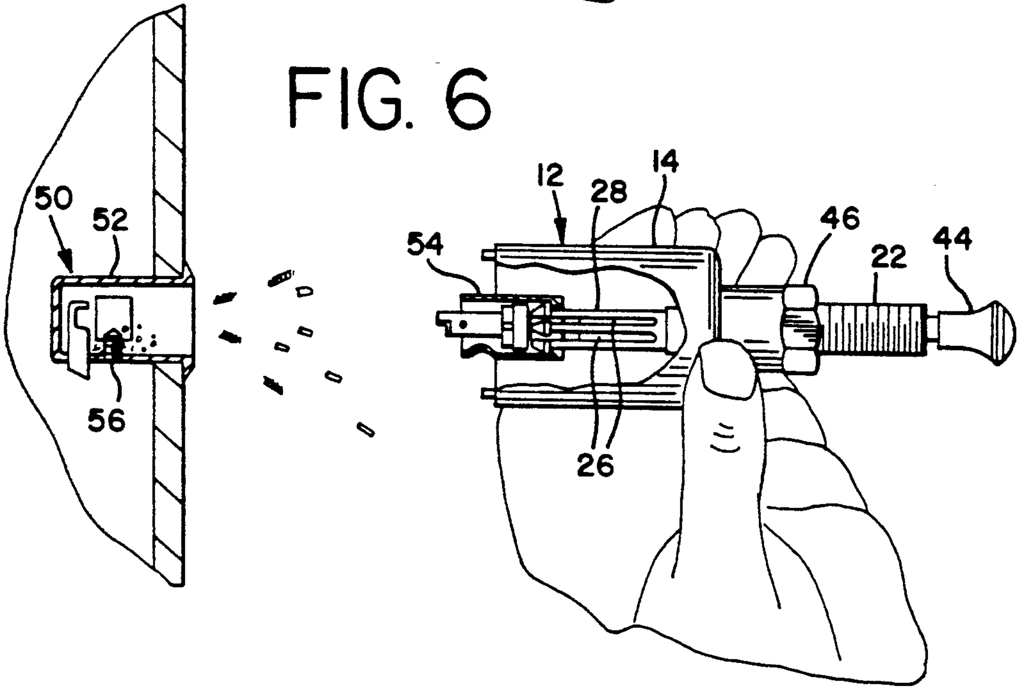
FIG. 6 is a similar view with portions broken away showing destruction of the tubular lock and removal of the inner cylinder therefrom.

Cylindrical or tubular locks are of generally standardized construction, and a representative lock 50 is illustrated in FIGS. 4–6 of the drawings. Tubular lock 50 comprises an outer cylinder or housing 52 and an inner cylinder 54 which is fixedly retained in the outer cylinder by a retaining pin 56. Inner cylinder 54 comprises an annular front rim 58 defining an annular passageway 60 which is adapted to receive a conventional cylindrical key for normal operation of the lock and a center post 61. Other elements of the tubular lock 50, such as the rod-like tumblers, springs, object-engaging means, and the like, need not be described in detail for an understanding of the present invention. Lock 50 is shown flush mounted in the planar wall or door of a representative device D, such as a vending machine cabinet.

Use and operation of the lock puller 10 to dismantle an inoperative tubular lock such as 50 may now be appreciated by referring to FIGS. 2 and 4–6. With the locking cup 42 in the withdrawn inoperative position, the flexible fingers 18 are inserted into the lock annular passageway 60 until the camming front faces 30 and rear gripping surfaces 32 are within the passageway and past the front rim 58 (see FIG. 2). In this position, the resilient fingers which have been slightly compressed to achieve entry into the passageway spring back to their normal state and the gripping surfaces 32 define an annular ring behind the lock cylinder rim 58 and of greater diameter than the passageway (see FIG. 4). At this point, the center shaft 38 is slid forwardly until the locking cup 42 fits over the lock center post 61 and is substantially coterminous with the tips of the fingers 28, thereby providing a rigid support and backing for said fingers. Rotational force is now applied to the nut 46 causing the housing 12 to move forwardly until the housing front edge 15 contacts the device D in which the lock 50 is mounted while the puller shaft 20 simultaneously moves rearwardly as illustrated in FIG. 5. The planar wall of the device D now acts as a bearing surface to prevent any further forward movement of the housing 12 of the tool. Continued application of rotational force to the nut 46, with a tool such as a pliers or the wrench illustrated, exerts a pulling force on lock inner cylinder 54 which results finally in a shearing of the retaining pin 56 or a physical deformation of the wall of the inner cylinder through which said pin had been positioned. In either case, the inner cylinder 54 is pulled past the retaining pin and is removed from the outer cylinder as shown in FIG. 6. The tubular lock 50 is thus removed from the device D with no damage caused to such device.

Where the tubular lock to be dismantled is part of a padlock or the like, the device to which the padlock is attached cannot provide a planar bearing surface for the housing 12 like that of the device D illustrated. For such applications, the invention comprises the pair of bearing pins 17, 17, which are spring-loaded and project from the front edge 15 of the housing 12. The pins 17 serve to non-rotatably position the housing on the padlock and permit operation of the tool as previously described.

From the foregoing description, it should be apparent that the invention provides a novel tool which may conveniently be used by authorized locksmiths for readily dismantling and opening tubular locks where such action is necessary. The tool is simple to operate and requires only the use of a common tool such as a wrench or pliers for application of sufficient pulling force. It should also be understood that the language employed herein is for purposes of description rather than limitation, and various changes can be made by those skilled in the art without departing from the spirit or scope of the invention which is defined in the appended claims.

What is claimed is:

1. A tool for dismantling a tubular lock having an inner cylinder with a center post and an annular passageway defined by a front rim comprising:

a housing and a first shaft longitudinally movable in said housing, said shaft having a threaded rear segment and a resilient front segment which is compressible and insertable into said passageway for cooperating with said front rim;

a second shaft slidably positioned in said first shaft and locking means on the front end of said second shaft movable forwardly and over said center post for maintaining said resilient front segment in cooperable engagement with said front rim; and force means threadedly mounted on said threaded rear segment and rotatable for withdrawing said first shaft and forcibly pulling said inner cylinder from the lock.

2. A tool according to claim 1 wherein said front segment comprises a plurality of longitudinal slits providing a plurality of circumferentially spaced fingers.

3. A tool according to claim 2 wherein the tips of said fingers comprise a forwardly tapering camming surface and a substantially vertical gripping surface behind said camming surface adapted to engage said front rim of the lock after insertion into said passageway.

4. A tool according to claim 1 wherein said locking means comprises a cylindrical cup having substantially the same diameter as the inner diameter of said front segment.

5. A tool according to claim 1 wherein said first shaft is longer than said housing whereby said threaded segment projects rearwardly from said housing, and said force means comprises a threaded nut mounted on said rearwardly projecting threaded segment.

6. A tool according to claim 1 comprising a longitudinal keyway in said rear segment and a pin mounted in said housing and cooperating with said keyway to prevent rotation of said first shaft in said housing.

7. A tool according to claim 1 comprising spring-loaded pins in said housing projecting forwardly from the front edge thereof, said pins being cooperable with the structure in which the tubular lock is mounted for preventing rotation of said housing when operating the tool.

8. A tubular lock puller for forcibly removing a lock inner cylinder having a center post and an annular passageway defined by a front rim, said lock puller comprising:

a housing having a front edge and a longitudinal bore therethrough;

a first shaft slidably mounted in said bore and longer than said housing;

said shaft comprising a threaded rear segment and a resilient front segment radially compressible and insertable into said annular passageway;

first means on said front segment for facilitating insertion thereof into said passageway and for engaging said rim after insertion into said passageway;

locking means positioned in said front segment and movable forwardly and over said center post for preventing radial compression of said front segment after insertion into said annular passageway; and threaded means mounted on said rear segment rotatable to withdraw said first shaft and cause said housing front edge to bear against a structure surrounding the tubular lock whereby said inner cylinder is forcibly removed and said lock is destroyed.

9. A tubular lock puller according to claim 8 comprising a longitudinal keyway in said rear segment and a pin mounted in said housing and cooperating with said keyway to prevent rotation of said first shaft in said housing.

10. A tubular lock puller according to claim 8 wherein said front segment is unthreaded and comprises a plurality of longitudinal slits forming a plurality of circumferentially spaced flexible fingers.

11. A tubular lock puller according to claim 10 wherein said first means comprises a tapered camming face on the tip of each of said fingers for facilitating insertion of said fingers into said passageway and a substantially vertical gripping face behind each of said camming faces for engaging said front rim after said finger tips have been inserted into said passageway.

12. A tubular lock puller according to claim 11 comprising a second shaft slidably positioned in a longitudinal bore in said threaded rear segment, said locking means being carried on the front end of said second shaft.

13. A tubular lock puller according to claim 12 wherein said locking means comprises a cylindrical cup having substantially the same diameter as the inner diameter of said front segment when said fingers are in the relaxed, inoperative position and adapted to fit over a center post of the lock.

14. A tubular lock puller according to claim 12 wherein said threaded means comprises a hexagonal nut threadedly mounted on a rearwardly projecting end of said rear segment, said nut being engageable by a wrench or the like for applying sufficient force to remove said inner cylinder from the lock.

15. A tubular lock puller according to claim 8 comprising a pair of pins spring-mounted in said housing and projecting forwardly from said housing front edge, said pins being cooperable with the tubular lock surrounding structure for preventing rotation of said housing when the lock puller is being operated.

* * * * *